United States Patent
Fujitsuka et al.

(10) Patent No.: US 11,243,676 B2
(45) Date of Patent: Feb. 8, 2022

(54) NUMERICAL CONTROL SYSTEM FOR MACHINE TOOL

(71) Applicant: OKUMA Corporation, Aichi (JP)

(72) Inventors: Kazunori Fujitsuka, Aichi (JP); Tadanobu Imai, Aichi (JP); Yasushi Fukaya, Aichi (JP)

(73) Assignee: OKUMA CORPORATION, Aichi (JP)

( * ) Notice: Subject to any disclaimer, the term of this patent is extended or adjusted under 35 U.S.C. 154(b) by 1069 days.

(21) Appl. No.: 14/920,182

(22) Filed: Oct. 22, 2015

(65) Prior Publication Data

US 2016/0117090 A1 Apr. 28, 2016

(30) Foreign Application Priority Data

Oct. 22, 2014 (JP) .............................. JP2014-215279

(51) Int. Cl.
*G06F 3/0484* (2013.01)
*G06F 3/0482* (2013.01)
(Continued)

(52) U.S. Cl.
CPC ....... *G06F 3/04847* (2013.01); *G05B 19/409* (2013.01); *G06F 3/0482* (2013.01); *G06F 3/04886* (2013.01); *Y02P 90/02* (2015.11)

(58) Field of Classification Search
CPC .............. G06F 3/04847; G06F 3/0482; G06F 11/3466; G06F 21/566; G06F 11/3636;
(Continued)

(56) References Cited

U.S. PATENT DOCUMENTS 3,699,317 A * 10/1972 Middleditch ........ G05B 19/414
318/562
4,393,449 A * 7/1983 Takeda ................. G05B 19/409
318/568.1
(Continued)

FOREIGN PATENT DOCUMENTS

CN     2916716 Y    6/2007
CN    101320256 A   12/2008
(Continued)

OTHER PUBLICATIONS

P. Michalik, M. Hatala and J. Duplák, "Creation of programs by Shop Floor programming for CNC machines using cam software," 2013 IEEE 17th International Conference on Intelligent Engineering Systems (INES), San Jose, 2013, pp. 261-264, doi: 10.1109/INES.2013.6632822. (Year: 2013).*

(Continued)

*Primary Examiner* — Anil K Bhargava
(74) *Attorney, Agent, or Firm* — Cantor Colburn LLP

(57) ABSTRACT

A numerical control system for a machine tool includes a display screen, a storage unit, and a control unit. The control unit executes a step of displaying, on the display screen, a designation screen that selects and designates one or more pieces of auxiliary information and auxiliary functions corresponding to each of basic work screens prepared for each work process using the machine tool, and associating with the basic work screen and storing in the storage unit one or more pieces of auxiliary information and auxiliary functions selected and designated by a user through the designation screen, and a step of simultaneously displaying, on the display screen, one basic work screen designated by the user among the basic work screens, and one or more virtual buttons that select one or more pieces of auxiliary informa- (Continued)

tion and one or more auxiliary functions, associated with the user-designated basic work screen.

4 Claims, 15 Drawing Sheets

(51) Int. Cl.
*G06F 3/0488* (2013.01)
*G05B 19/409* (2006.01)

(58) Field of Classification Search
CPC .......... G06F 2201/865; G06F 11/3006; G06F 2201/815; G06F 11/301; G06F 11/3089; G06F 2201/87; G06F 9/465; G06F 11/0709; G06F 11/0712; G06F 11/3024; G06F 11/32; G06F 11/3476; G06F 11/3495; G06F 11/3093; G06F 3/0484; G06F 9/455; G06F 1/1694; G06F 3/017; G06F 3/0304; G06F 3/1423; G06F 3/1454; G06F 16/337; G06F 3/04817; G06F 3/0488; G06F 3/04886; G06F 40/20; G06F 40/279; G06F 40/30; G05B 19/409; G05B 23/0216; G05B 19/402; G05B 19/40937; G05B 19/41825; G05B 2219/32128; G05B 2219/32351; G05B 19/18; G05B 2219/31472; G05B 2219/31474; G05B 2219/35481; G05B 23/0272; Y02P 90/02
See application file for complete search history.

(56) References Cited

U.S. PATENT DOCUMENTS

| | | | | |
|---|---|---|---|---|
| 4,396,976 A * | 8/1983 | Hyatt | ................ | B60R 16/0373 700/1 |
| 4,530,046 A * | 7/1985 | Munekata | ........ | G05B 19/40935 318/568.1 |
| 4,664,570 A * | 5/1987 | Tsukiji | ................... | G05B 19/41 409/132 |
| 4,972,322 A * | 11/1990 | Asakura | .......... | G05B 19/40938 318/568.1 |
| 5,113,517 A * | 5/1992 | Beard | ..................... | G06F 9/451 703/23 |
| 5,815,400 A * | 9/1998 | Hirai | .................... | G05B 19/401 700/173 |
| 5,933,353 A * | 8/1999 | Abriam | ............. | G05B 19/4097 700/171 |
| 5,984,503 A * | 11/1999 | Strickland | ........... | G05B 19/409 318/569 |
| 6,112,133 A * | 8/2000 | Fishman | .......... | G05B 19/40937 700/182 |
| 6,268,853 B1 * | 7/2001 | Hoskins | ................ | G05B 15/02 700/83 |
| 6,338,003 B1 * | 1/2002 | Kamiguchi | ......... | G05B 19/409 700/169 |
| 6,523,045 B1 * | 2/2003 | Beatty | .................... | G06Q 10/04 |
| 6,556,950 B1 * | 4/2003 | Schwenke | ............. | G05B 17/02 700/83 |
| 7,136,825 B2 * | 11/2006 | Araki | ............... | G06Q 10/06311 705/7.16 |
| 7,949,422 B1 * | 5/2011 | Little | .................... | G05B 19/409 700/180 |
| 10,126,732 B2 * | 11/2018 | Ishii | ....................... | G05B 19/18 |
| 2002/0120921 A1 * | 8/2002 | Coburn | ............ | G05B 19/41885 717/140 |
| 2002/0152003 A1 * | 10/2002 | Shinozaki | ........... | G05B 19/182 700/169 |
| 2002/0193905 A1 * | 12/2002 | Davison | ............. | G05B 19/4185 700/180 |
| 2003/0036808 A1 | 2/2003 | Kato et al. | | |
| 2003/0067496 A1 * | 4/2003 | Tasker | ............ | G05B 19/40933 715/846 |
| 2003/0088329 A1 * | 5/2003 | Rutkowski | ........... | G05B 19/408 700/95 |
| 2003/0195642 A1 * | 10/2003 | Ragnini | ............... | G05B 19/409 700/56 |
| 2003/0208293 A1 * | 11/2003 | Mountcastle, III | ......................... | G05B 19/41865 700/96 |
| 2004/0073404 A1 * | 4/2004 | Brooks | ................ | G05B 19/409 702/183 |
| 2008/0052146 A1 * | 2/2008 | Messinger | ............ | G06Q 10/06 705/7.23 |
| 2008/0091394 A1 * | 4/2008 | Hahn | .................. | G05B 19/4069 703/7 |
| 2009/0062950 A1 * | 3/2009 | Chen | ................ | G05B 19/41875 700/95 |
| 2009/0144027 A1 * | 6/2009 | Mindeman | ........... | G05B 19/042 702/183 |
| 2009/0192849 A1 * | 7/2009 | Hughes | ..................... | G06F 8/10 705/7.11 |
| 2009/0222911 A1 * | 9/2009 | Chen | .................... | G05B 19/409 726/19 |
| 2010/0037180 A1 | 2/2010 | Elias et al. | | |
| 2010/0063608 A1 | 3/2010 | Miller | | |
| 2010/0292822 A1 * | 11/2010 | Hahn | ............... | G05B 19/40937 700/98 |
| 2010/0305758 A1 * | 12/2010 | Nishi | ..................... | B23Q 17/00 700/264 |
| 2012/0290121 A1 * | 11/2012 | Gronbach | ............ | G05B 19/409 700/180 |
| 2013/0131840 A1 * | 5/2013 | Govindaraj | ...... | G05B 19/41865 700/19 |
| 2013/0257738 A1 | 10/2013 | Tanaka | | |
| 2013/0304248 A1 * | 11/2013 | Lange | ................ | G05B 19/4097 700/175 |
| 2013/0311950 A1 * | 11/2013 | Kim | .................. | G05B 19/40935 715/846 |
| 2013/0338815 A1 | 12/2013 | Ogawa et al. | | |
| 2014/0074279 A1 * | 3/2014 | West | ..................... | G05B 19/409 700/159 |
| 2014/0172148 A1 * | 6/2014 | Miller | .................. | G05B 19/409 700/183 |
| 2014/0200706 A1 * | 7/2014 | Pruschek | ......... | G05B 19/41885 700/159 |
| 2015/0338834 A1 * | 11/2015 | Furuta | ................ | G05B 19/4069 700/31 |
| 2015/0355787 A1 * | 12/2015 | Clay | ..................... | G06F 3/0482 715/734 |
| 2016/0103447 A1 * | 4/2016 | Sinn | .................. | G05B 19/4068 700/182 |
| 2016/0117090 A1 * | 4/2016 | Fujitsuka | .............. | G05B 19/409 715/765 |
| 2016/0179085 A1 * | 6/2016 | Seitz | .................... | G05B 19/414 700/180 |
| 2016/0236308 A1 * | 8/2016 | Suzuyama | ........... | B23Q 37/007 |
| 2017/0031345 A1 * | 2/2017 | Ono | ..................... | G05B 19/409 |
| 2017/0269811 A1 * | 9/2017 | Tsujimura | ......... | G06F 3/04817 |

FOREIGN PATENT DOCUMENTS

| | | | |
|---|---|---|---|
| CN | 103238124 A | 8/2013 | |
| CN | 102981448 B * | 9/2014 | .......... G05B 19/406 |
| DE | 19982989 T1 | 3/2002 | |
| JP | 2000066709 A | 3/2000 | |
| JP | 2003046299 A | 2/2003 | |
| JP | 2006338165 A | 12/2006 | |
| JP | 2012043027 A | 3/2012 | |
| JP | 5426727 B2 | 2/2014 | |

OTHER PUBLICATIONS

JP Notice of Grounds for Rejection corresponding to Application No. 2014-215279; dated Apr. 3, 2018.
SIPO First Office Action corresponding to Application No. 201510679008.X; dated Aug. 3, 2018.

(56) References Cited

OTHER PUBLICATIONS

DE Office Action for corresponding DE Application No. 102015117890.7; dated May 14, 2021.

\* cited by examiner

NUMERICAL CONTROL SYSTEM FOR MACHINE TOOL

PRIORITY INFORMATION

The present invention claims priority under 35 U.S.C. § 119 to Japanese Application No. 2014-215279 filed on Oct. 22, 2014, the entire content of which is incorporated herein by reference.

BACKGROUND

Technical Field

The present invention relates to a numerical control system for a machine tool, including a display device (display screen).

Related Art

FIG. 1 is a diagram illustrating an exemplary operating panel of a numerical control system for a machine tool. This operating panel includes a touch panel screen 1, work screen selection buttons 2, and a keyboard 3. Here, in a display area of the touch panel screen 1, a work screen selected by an operator by using the work screen selection buttons 2 is displayed. The work screen is prepared in advance for each work process such as tool preparation, program creation, and machining, which are required in machining using a machine tool.

FIGS. 2 to 5 are diagrams exemplifying various types of work screens displayed on the touch panel screen 1. Specifically, FIG. 2 is a machining work screen displaying a current position of machining requiring confirmation in machining. FIG. 3 is a machining work screen displaying a machining program in operation, requiring confirmation in machining. FIG. 4 is a program creating work screen required in creating a program. FIG. 5 is a tool preparation work screen that sets a tool length correction value and a tool diameter correction value required in preparing a tool.

At the bottoms of these work screens, buttons that call various types of functions (function call buttons 4) used in carrying out work are disposed and displayed. The operator can call and use necessary functions by holding down (touching) these function call buttons 4. In this way, the operator carries out work such as tool preparation, program creation, and machining by using the work screens prepared in advance.

As described above, the operator has no choice but to carry out work using a screen for each work, prepared in advance. For example, even when creating a program during machining, the operator is going to use the program creating work screen that has been prepared in advance for program creation. Here, in the related art, while this program creating work screen (screen illustrated in FIG. 4) is used (displayed), information for confirming the machining status cannot be displayed, and in order to confirm the machining status, it has been necessary to switch into a machining work screen (screen illustrated in FIG. 2 or 3) each time when needed.

When machining, it is also necessary to confirm various types of information such as the progress of a machining program, the position of a tool blade tip, machining load, information on a tool used for machining, machining time, and the operating status of various kinds of auxiliary devices mounted on a machine. It is difficult to simultaneously display such a wide variety of information on a limited screen display area. Therefore, in the screen display device in the related art, a plurality of machining work screens are prepared. As a result, disadvantageously, the operator has to switch and use machining work screens each time when needed.

In addition, along with the sophistication of machine tools and numerical control systems, functions prepared respectively for tool preparation, program creation, and machining have been increasing in number. Consequently, the number of buttons that call the functions (function call buttons 4) disposed on each work screen has increased, and a variety of buttons have been disposed separately on a plurality of work screens. In this case, there have been produced negative effects of increased trouble such as looking for a button indicating a function to be called and switching work screens in order to use the button.

Furthermore, given that machine tools are used for long periods of 10, 15, and 20 years, various types of new functions that increase the productivity of the machine tools are developed along with technical advancement in computer software. However, it has been difficult to add and use those developed functions on the work screens of old machines. Moreover, the information to be confirmed and the functions to be called, mentioned above, differ depending on the work procedure and the proficiency of each operator. Therefore, also in this respect, there have been many restrictions in work screens prepared in advance and work efficiency has deteriorated.

SUMMARY

A numerical control system for a machine tool according to an embodiment of the present invention is a numerical control system for a machine tool, including a display screen, a storage unit, and a control unit, wherein the control unit executes a selection and designation step of displaying, on the display screen, a designation screen that selects and designates one or more pieces of auxiliary information and/or one or more auxiliary functions corresponding to each of a plurality of basic work screens prepared for each work process using the machine tool, and associating with the basic work screen and storing in the storage unit one or more pieces of auxiliary information and/or one or more auxiliary functions selected and designated by a user through the designation screen, and a display step of simultaneously displaying, on the display screen, one basic work screen designated by the user among the plurality of basic work screens, and one or more virtual buttons that select one or more pieces of auxiliary information associated with the basic work screen designated by the user and/or one or more auxiliary functions associated with the basic work screen designated by the user.

In a preferred embodiment, a correspondence relationship between the plurality of basic work screens and the one or more pieces of auxiliary information and/or one or more auxiliary functions is set and stored for each of two or more users, and the control unit displays, in the display step, one or more pieces of auxiliary information and/or one or more virtual buttons, both of which are associated with a user who performs operation. In another preferred embodiment, the display screen is a touch panel screen. In a further preferred embodiment, the designation screen is a screen simultaneously displaying a preview screen indicating a screen layout displayed in the display step and a menu screen listing two or more pieces of auxiliary information and/or two or more virtual buttons, both of which are selectable.

A numerical control system for a machine tool according to another embodiment of the present invention is a numerical control system for a machine tool, provided with a display device, including a basic screen display unit configured to display, in a part of a display area of the display device, one basic work screen selected by a user from among a plurality of basic work screens prepared for each work process using a machine tool, a display designation unit configured to select and designate one or more pieces of auxiliary information and/or one or more auxiliary function buttons that call one or more auxiliary functions, both of which correspond to each of the plurality of basic work screens, and an auxiliary display unit configured to display one or more pieces of auxiliary information and/or one or more auxiliary function buttons, both of which are associated with a basic work screen displayed by the basic screen display unit, together with the basic work screen displayed.

In a preferred embodiment, the numerical control system for a machine tool further includes a user selection unit configured to select a user who performs operation, and a plurality of user selection and storage units prepared for each of the users, wherein one or more pieces of auxiliary information and/or one or more auxiliary function buttons, both of which correspond to each of the plurality of basic work screens, are set for each user and stored in a corresponding user selection and storage unit, and the auxiliary display unit displays one or more pieces of auxiliary information and/or one or more auxiliary function buttons, both of which have been stored in a user selection and storage unit corresponding to the user selected by the user selection unit.

According to an embodiment of the present invention, information required for work using a machine tool as well as auxiliary information and/or auxiliary function buttons are displayed, and the auxiliary information and/or the auxiliary function buttons to be displayed can be set freely. As a result, it is possible to improve the versatility and operability of a numerical control system.

BRIEF DESCRIPTION OF DRAWINGS

Preferred embodiments of the present invention will be described in detail with reference to the following figures, wherein.

DETAILED DESCRIPTION

Figure 1:
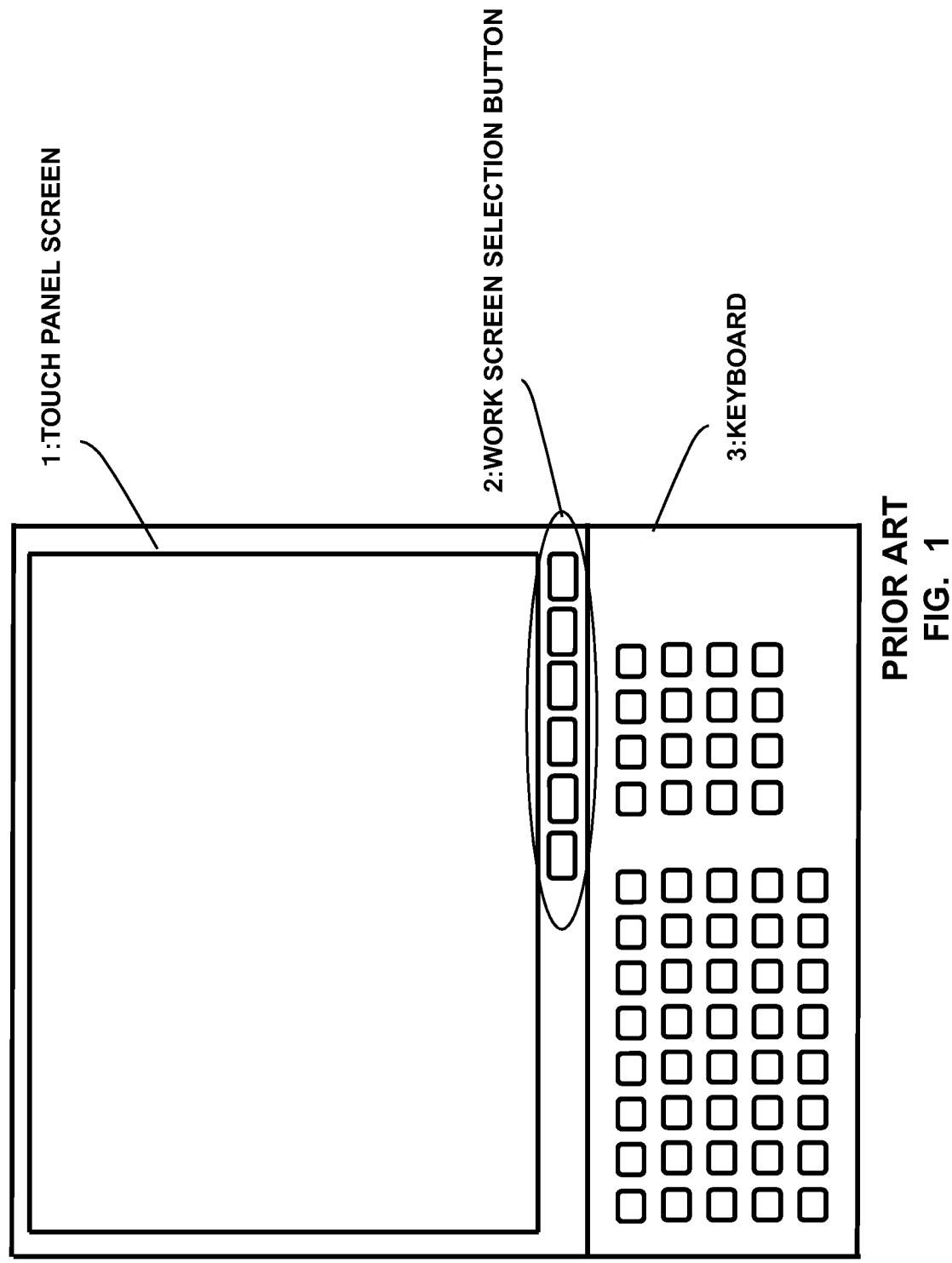
FIG. 1 is a diagram illustrating an operating panel of a numerical control system for a machine tool in the related art.
Figure 2:
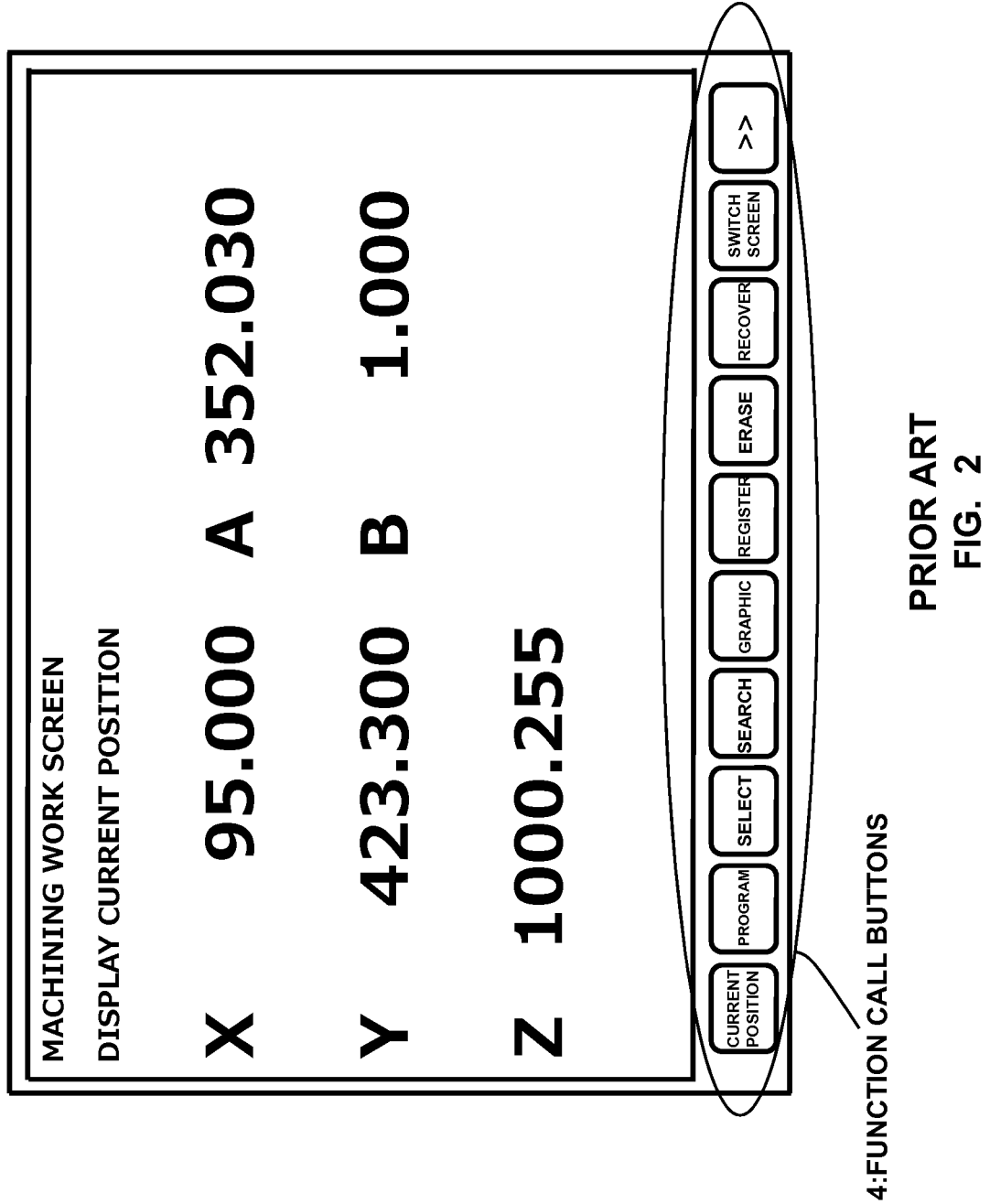
FIG. 2 is a diagram illustrating an exemplary machining work screen in the related art.
Figure 3:
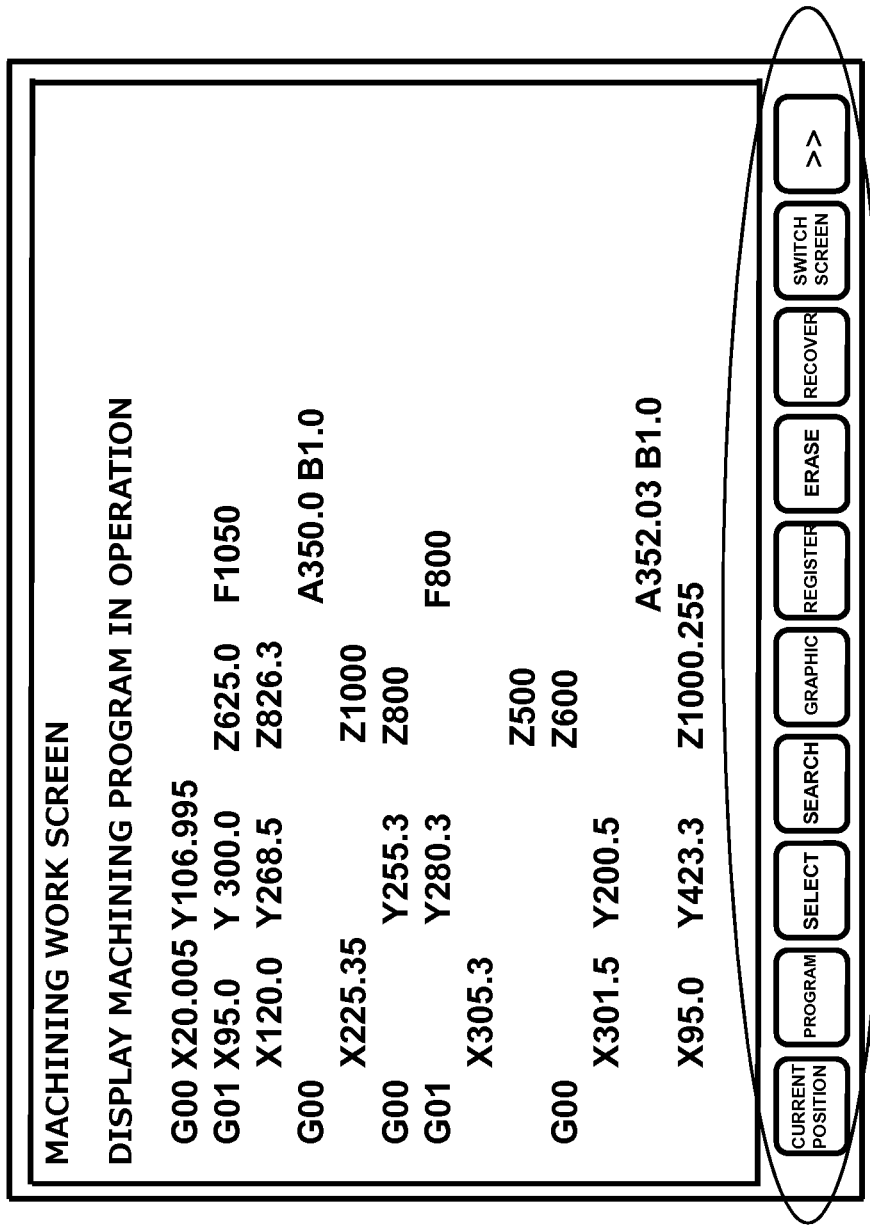
FIG. 3 is a diagram illustrating an exemplary machining work screen in the related art.
Figure 4:
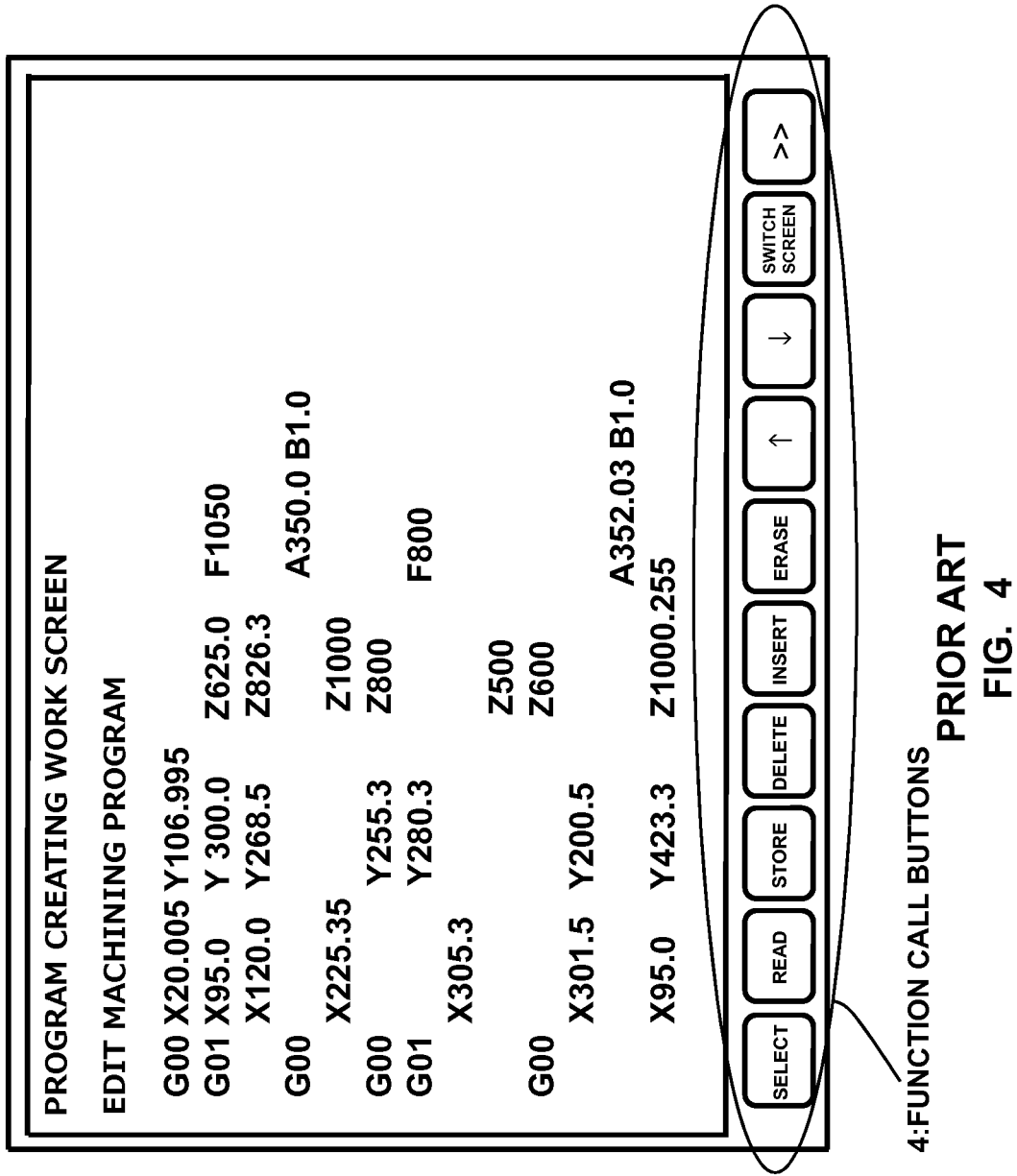
FIG. 4 is a diagram illustrating an exemplary program creating work screen in the related art.
Figure 5:
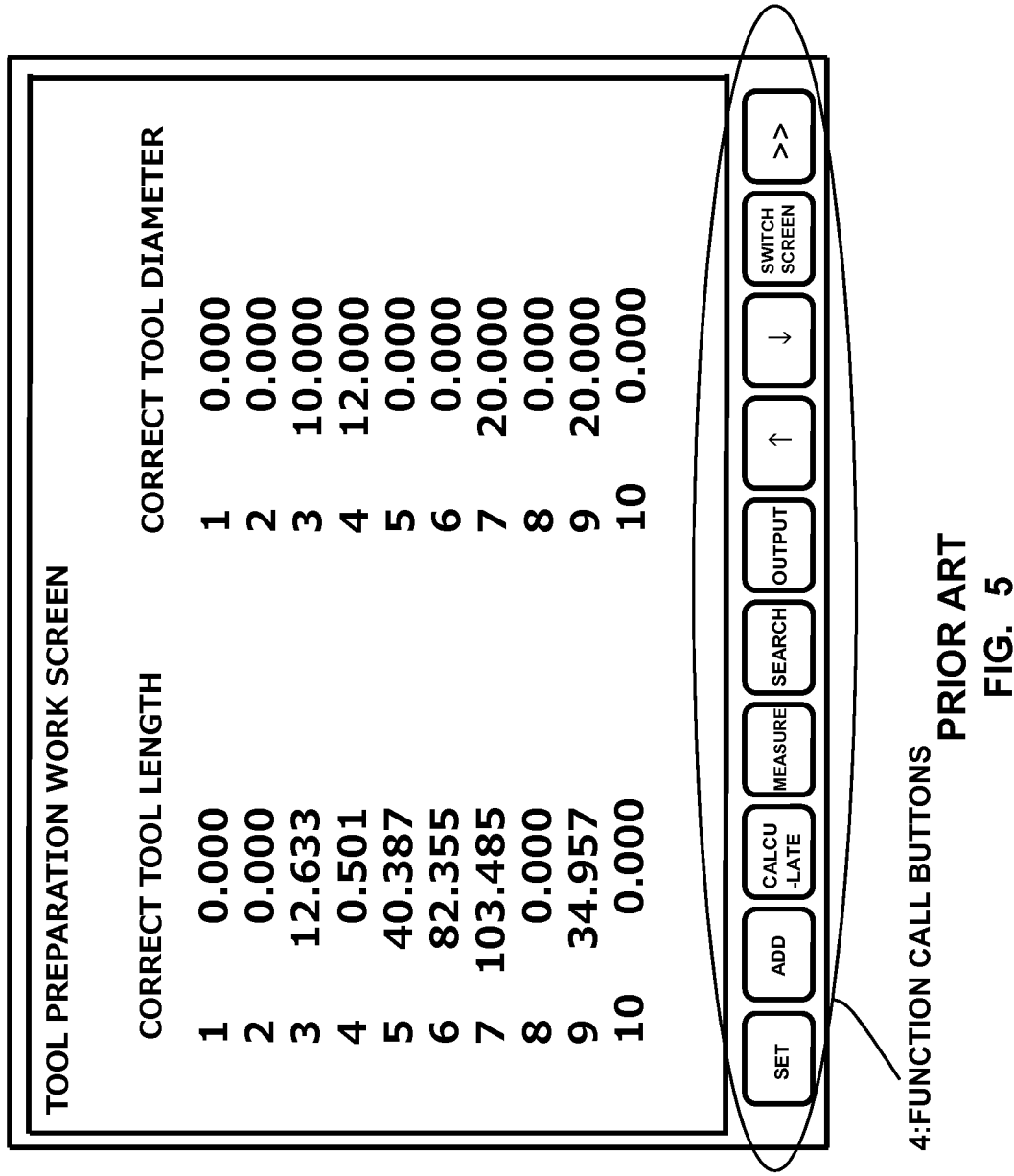
FIG. 5 is a diagram illustrating an exemplary tool preparation work screen in the related art.
Figure 6:
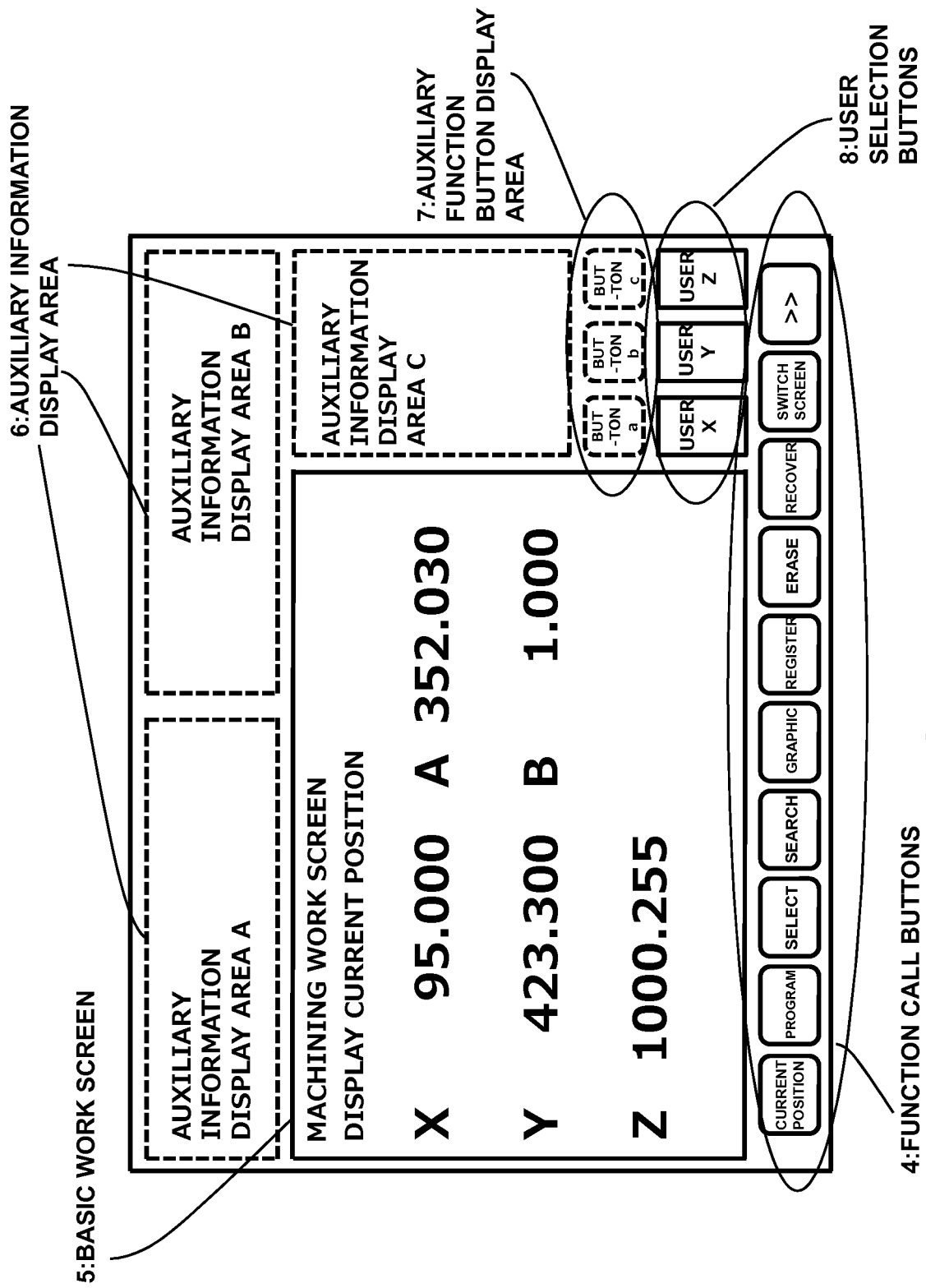
FIG. 6 is a diagram illustrating an exemplary machining work screen according to an embodiment of the present invention.
Figure 7:
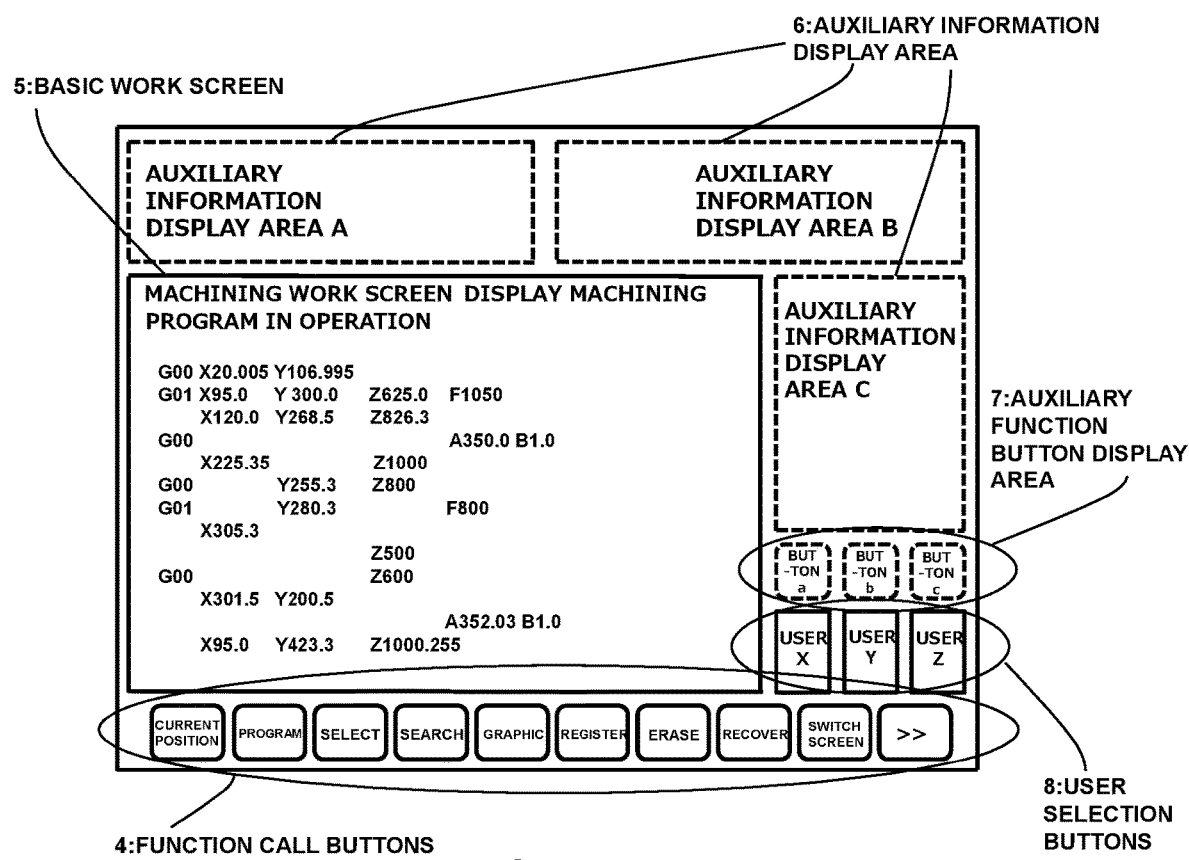
FIG. 7 is a diagram illustrating an exemplary machining work screen according to an embodiment of the present invention.
Figure 8:
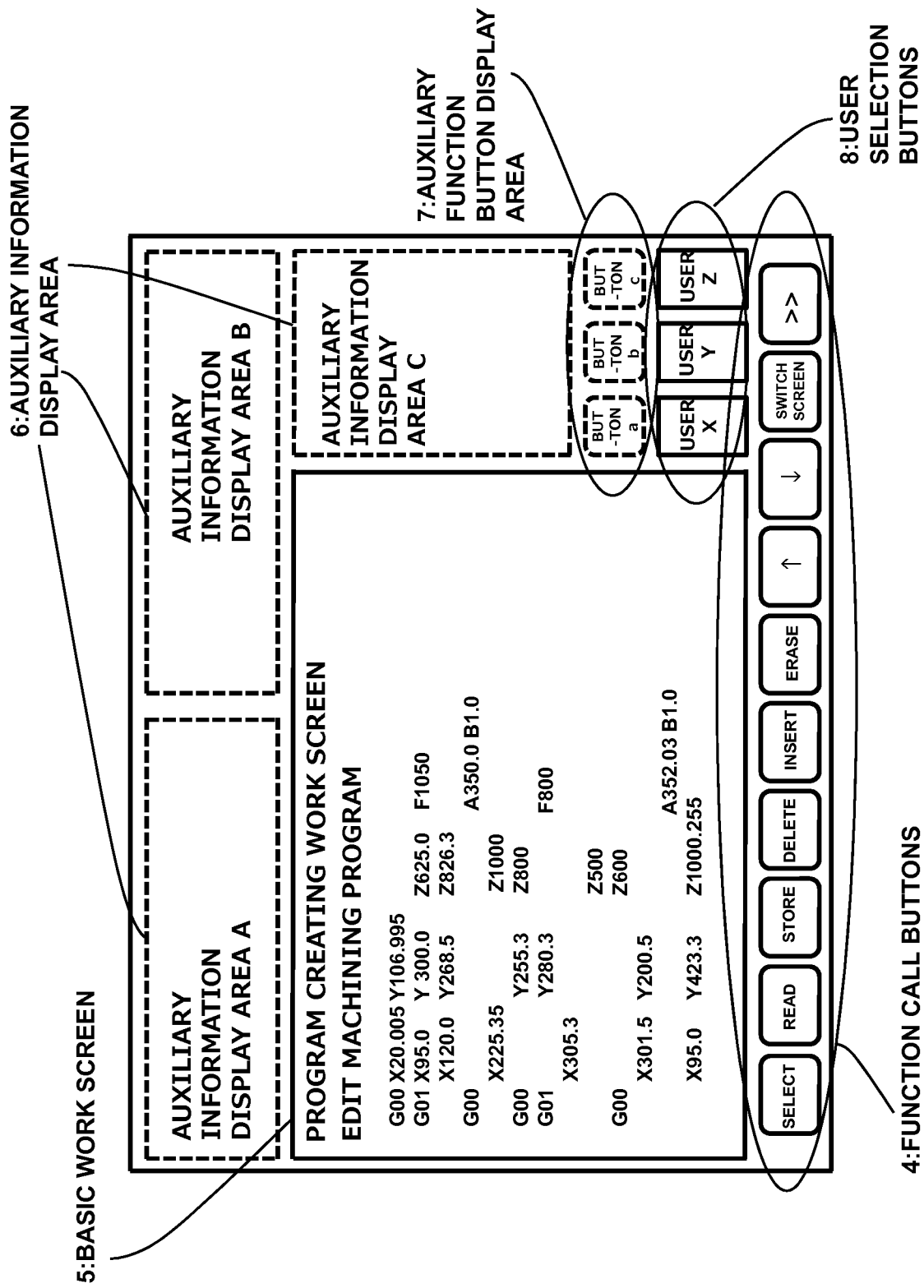
FIG. 8 is a diagram illustrating an exemplary program creating work screen according to an embodiment of the present invention.
Figure 9:
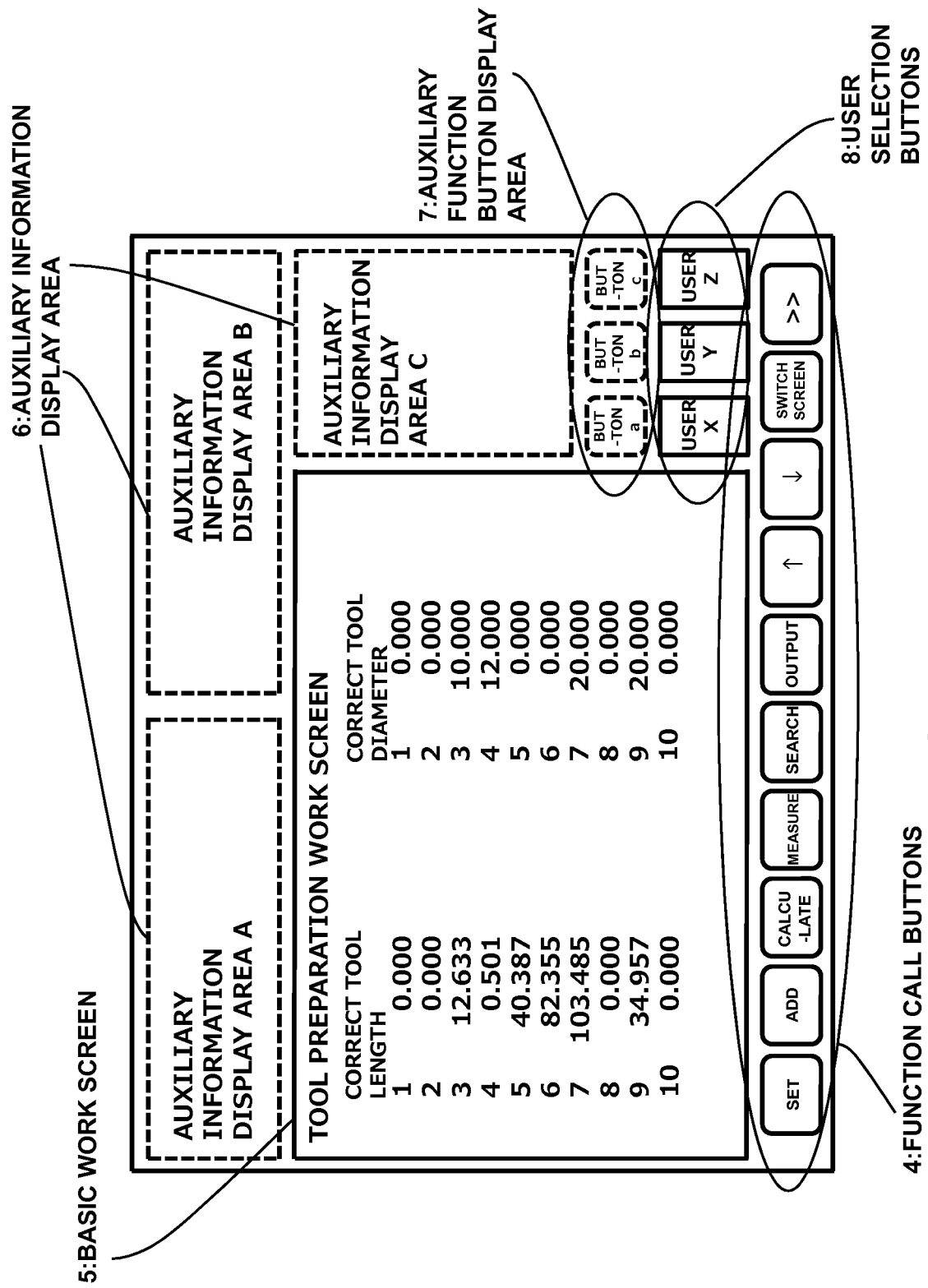
FIG. 9 is a diagram illustrating an exemplary tool preparation work screen according to an embodiment of the present invention.
Figure 10:
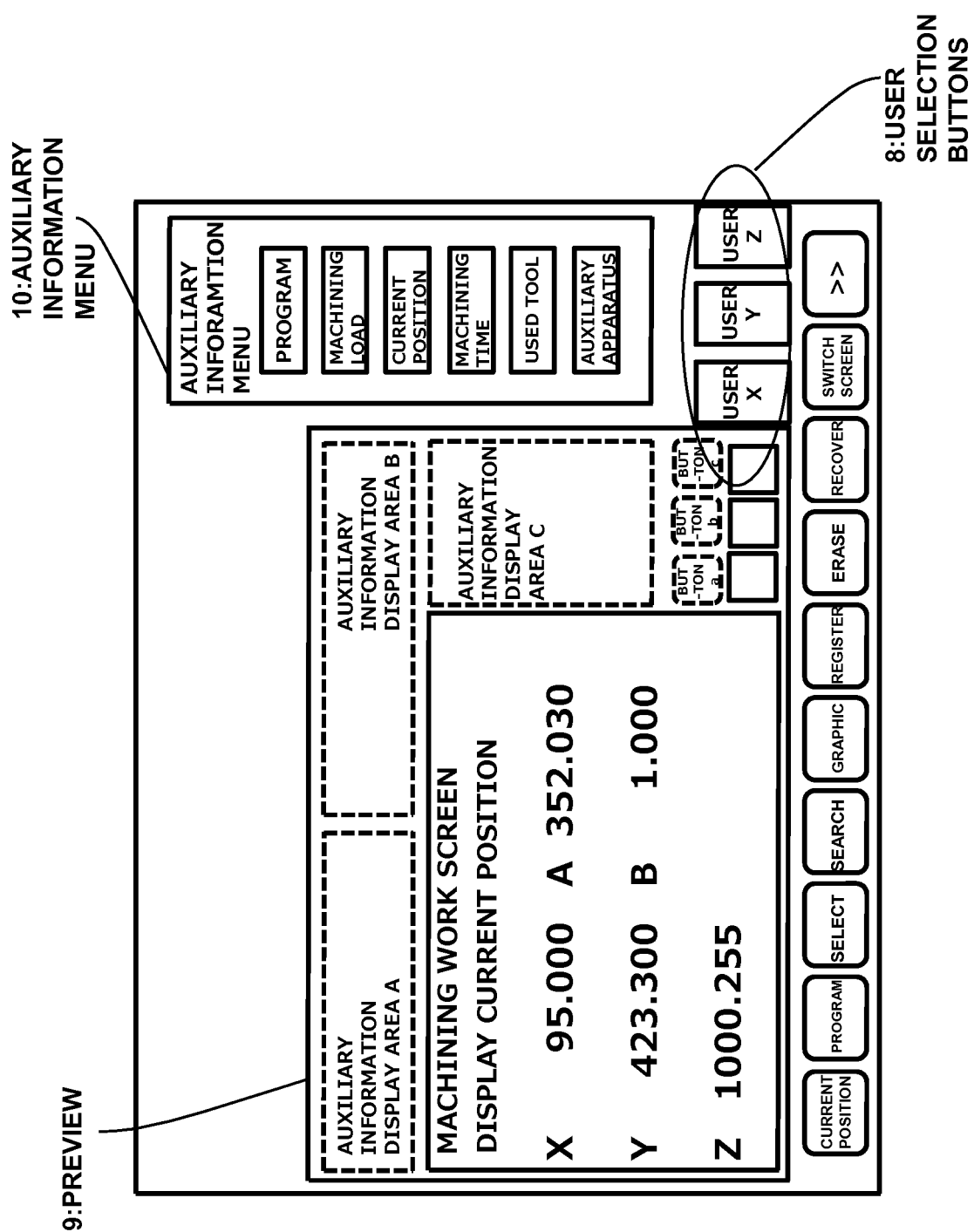
FIG. 10 is a diagram illustrating an exemplary screen for selecting and designating auxiliary information to be displayed.
Figure 11:
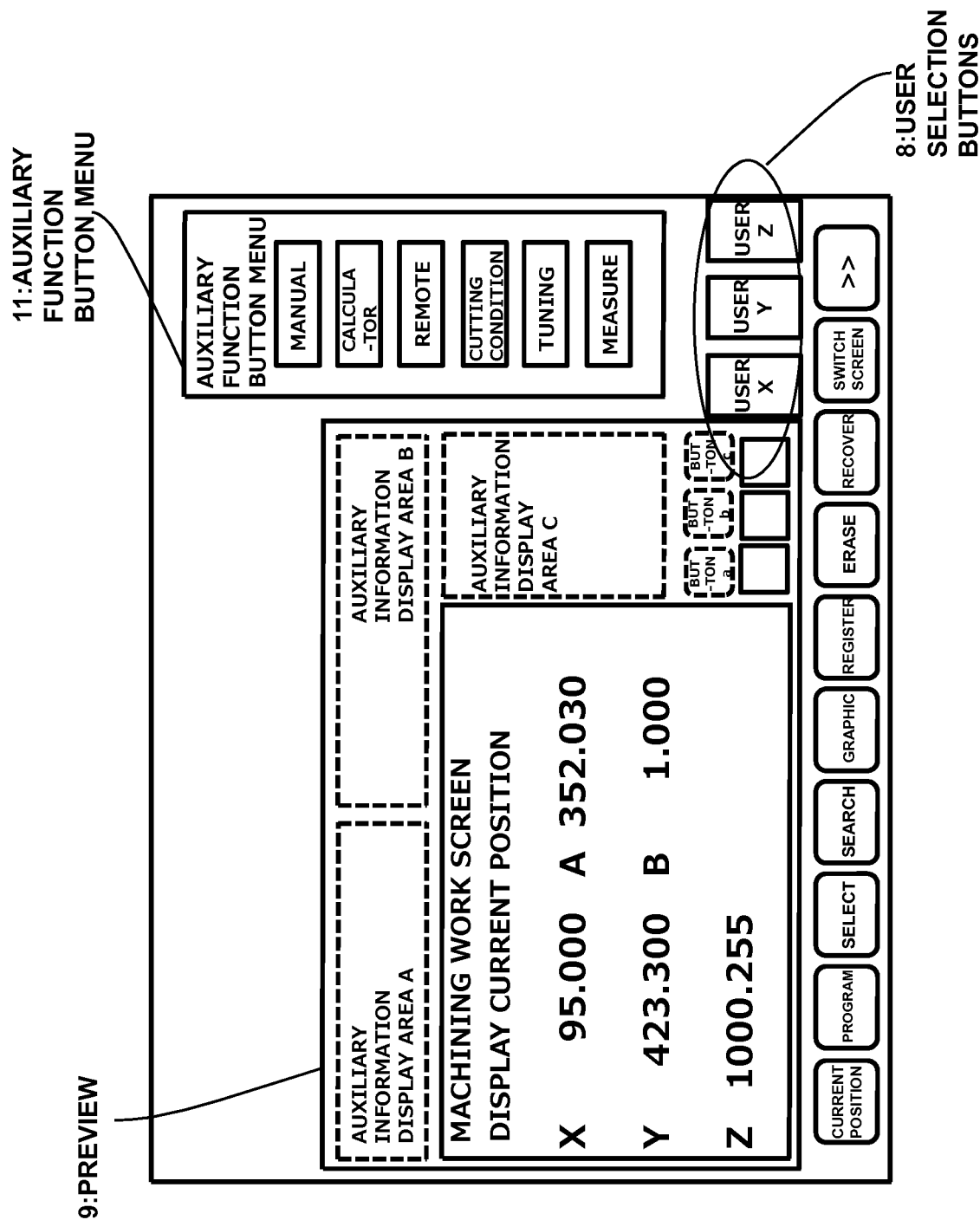
FIG. 11 is a diagram illustrating an exemplary screen for selecting and designating auxiliary function buttons to be displayed.
Figure 12:
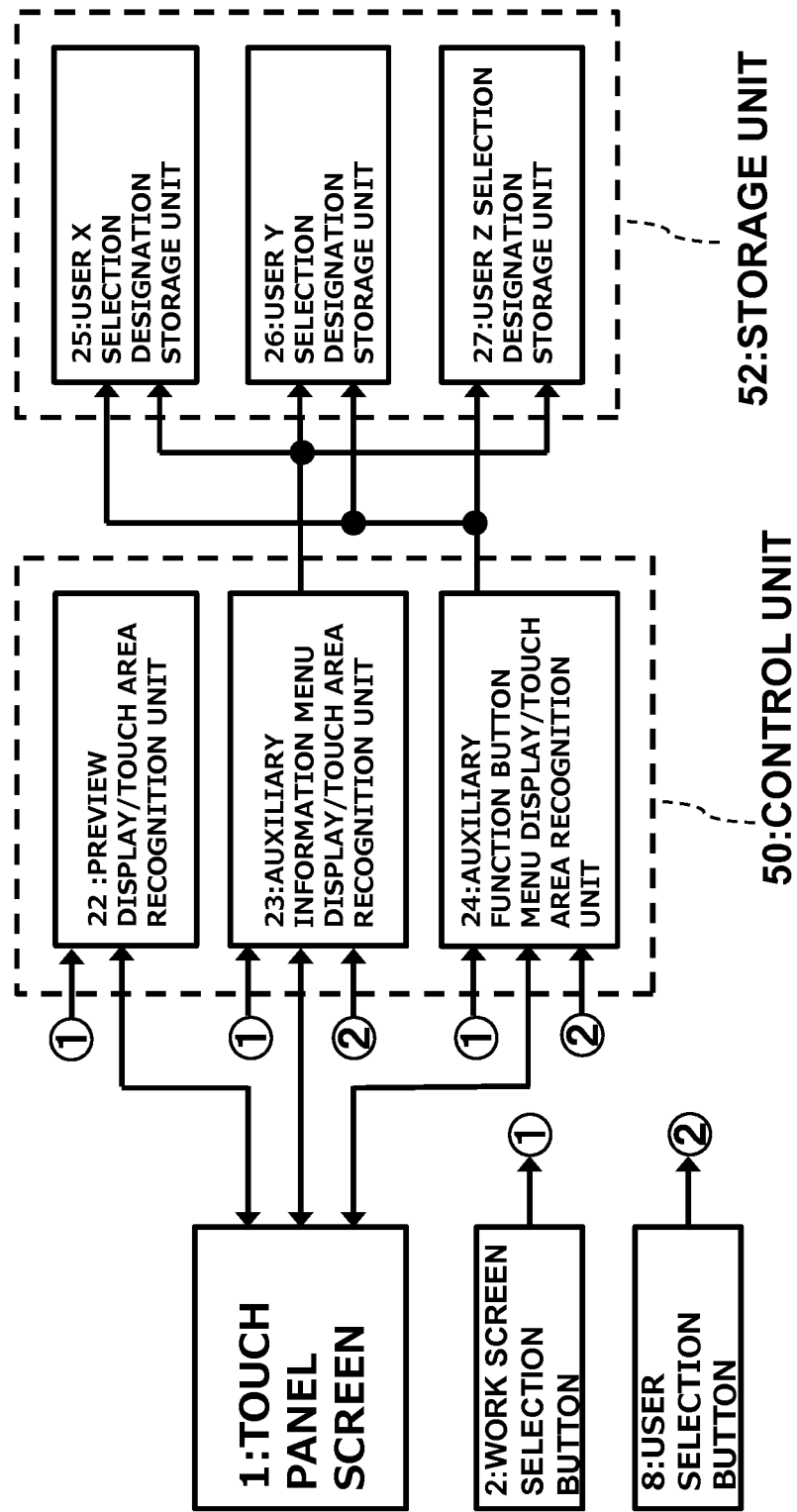
FIG. 12 is a diagram illustrating a partial block diagram according to an embodiment of the present invention.
Figure 13:
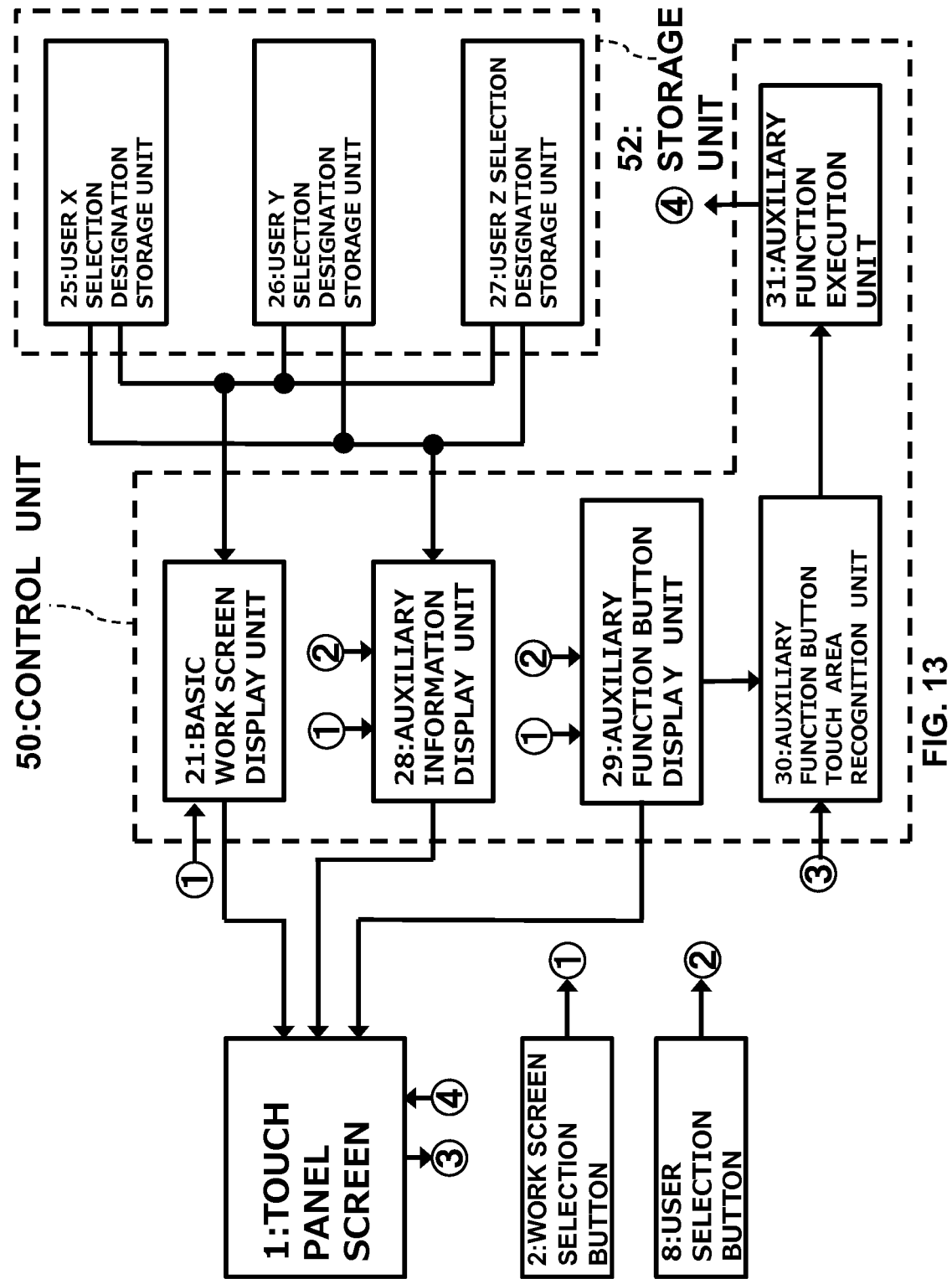
FIG. 13 is a diagram illustrating a partial block diagram according to an embodiment of the present invention.
Figure 14:
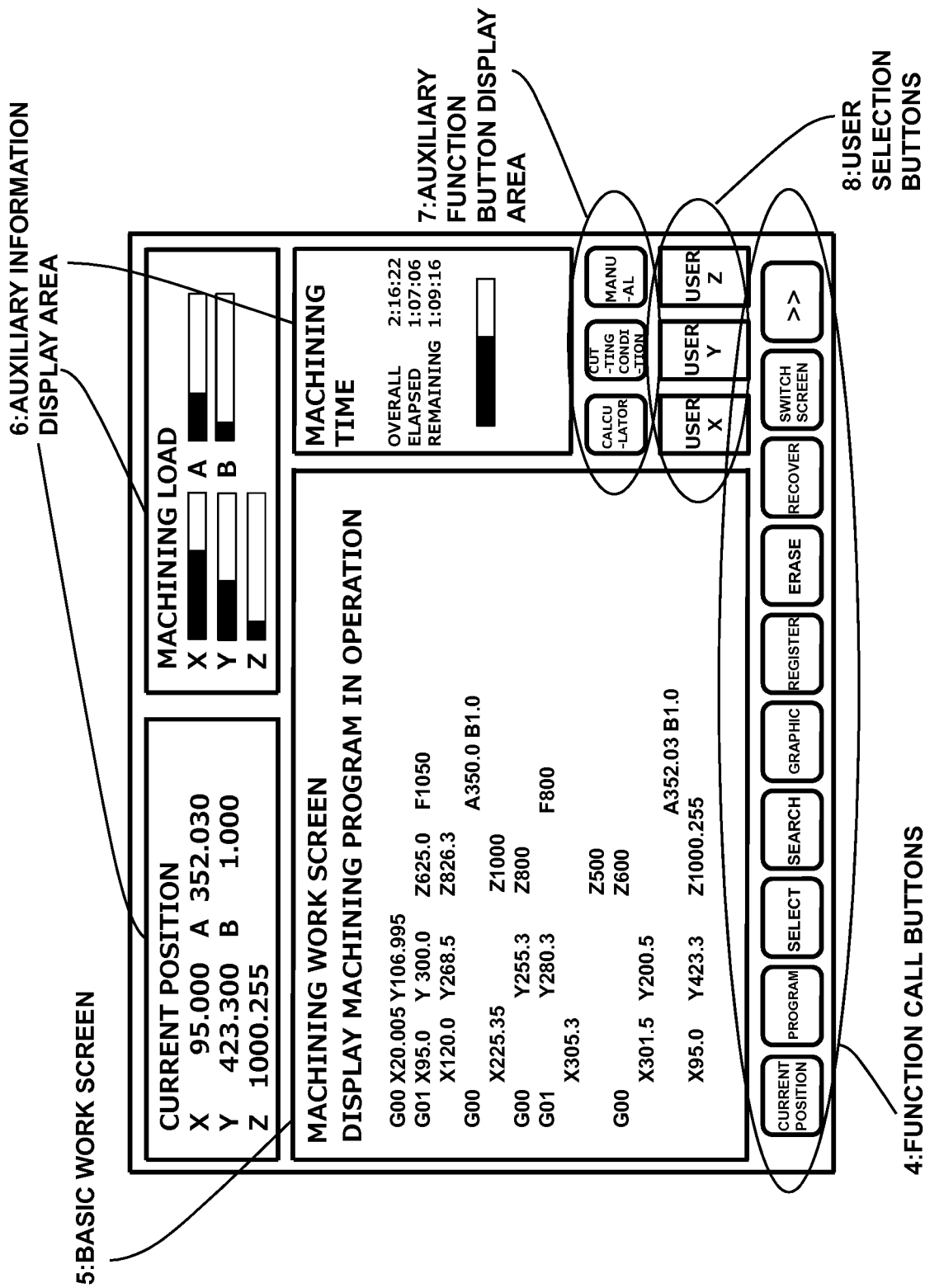
FIG. 14 is a diagram illustrating an example of displaying auxiliary information and auxiliary function buttons.
Figure 15:
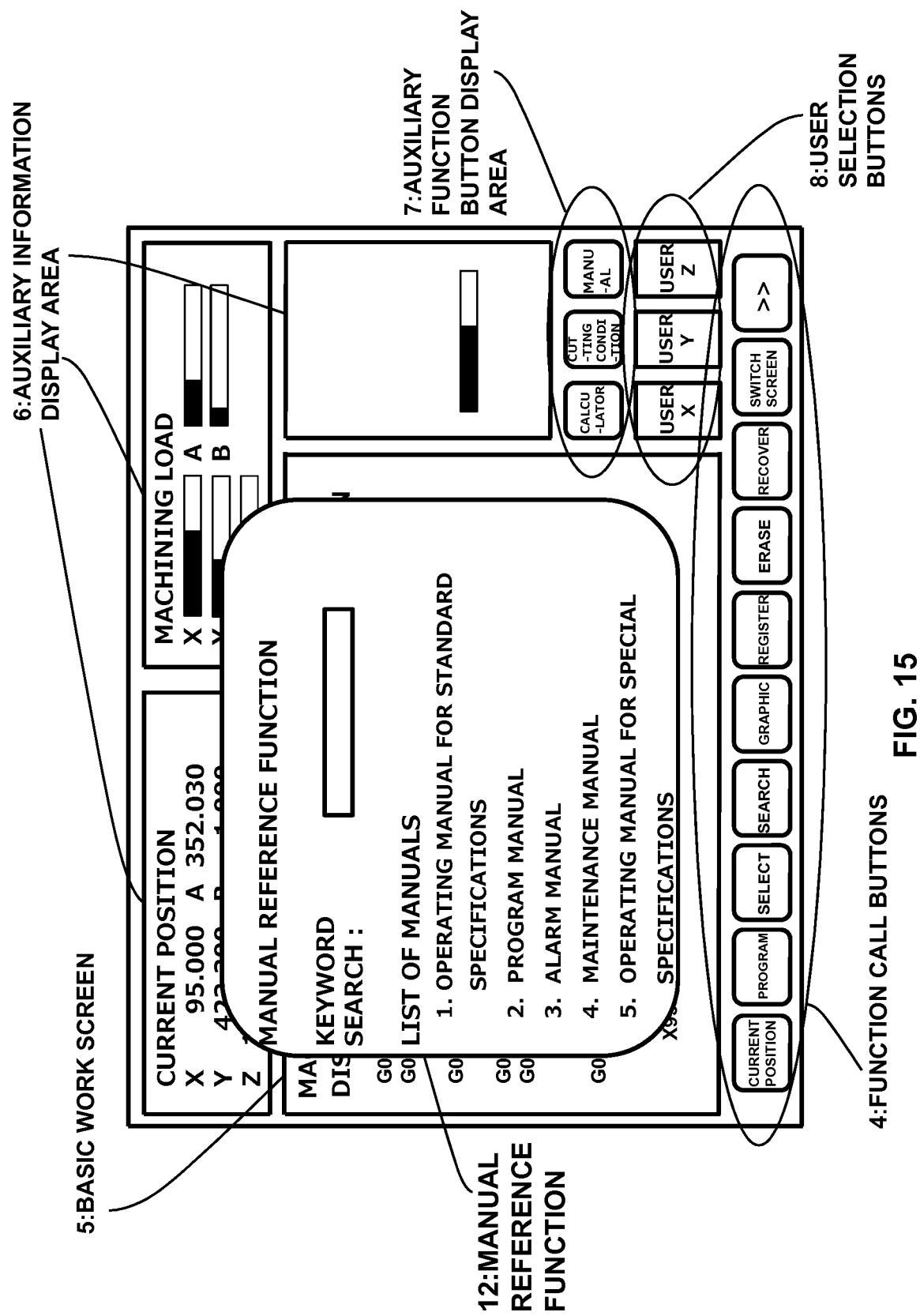
FIG. 15 is a diagram illustrating an example of an auxiliary function that has been called.

A numerical control system for a machine tool according to an embodiment of the present invention will be described below with reference to the drawings. FIGS. 6 to 9 are diagrams exemplifying various types of work screens displayed on a touch panel screen 1 of the numerical control system. FIGS. 10 and 11 are diagrams exemplifying designation screens. FIGS. 12 and 13 are block diagrams illustrating a partial configuration of the numerical control system. FIG. 14 is a diagram illustrating an example of displaying auxiliary information and auxiliary function buttons. FIG. 15 is a diagram illustrating an auxiliary function that has been called.

The numerical control system for the machine tool according to an embodiment of the present invention includes the touch panel screen 1 that is a display screen, a control unit 50 for carrying out various types of calculation, an input unit such as a keyboard, a storage unit 52, and the like (see FIGS. 12 and 13). The touch panel screen 1 displays an image in response to an instruction from the control unit 50, detects a touch operation by a user, and sends a signal in accordance with the detection result to the control unit 50. The control unit 50 includes, for example, a CPU, and carries out various types of calculation. This control unit 50 is conceptually divided into a plurality of function units 21 to 24 and 28 to 31. The storage unit 52 stores various types of information, for example, an operation program that drives the numerical control system, and various types of parameters required for displaying screens. The storage unit 52 also functions as storage units 25 to 27 provided for three users. This storage unit 52 includes one or more storage media such as a ROM, a RAM, a non-volatile memory, and a hard disc drive.

Next, contents displayed on this touch panel screen 1 will be described. The touch panel screen 1 is divided into several areas. Specifically, the touch panel screen 1 is divided into an area of a basic work screen 5, an auxiliary information display area 6, an auxiliary function button display area 7, an area of user selection buttons 8, and an area of function call buttons 4. FIGS. 6, 7, 8, and 9 are examples displaying machining work screens, a program creating work screen, and a tool preparation work screen, each of which has its own basic work screen 5. One of the machining work screens displays the current position of machining required for machining, and the other displays a machining program in operation, required for machining. The program creating work screen is required for creating a program. The tool preparation work screen is to set tool length/tool diameter corrections required for preparing a tool.

Here, in the display areas on the touch panel screen 1, three kinds of auxiliary information are displayed in the auxiliary information display area 6, which is a part of space areas excluding the basic work screen 5. In the auxiliary function button display area 7, which is also a part of the space areas, three kinds of auxiliary function call buttons are displayed. Furthermore, in a part of the space areas, three user selection buttons 8 are disposed such that the auxiliary information and auxiliary function buttons displayed can be disposed and used for each user (operator) and for each work screen.

Here, a selection and designation method, with which three kinds of auxiliary information are displayed for each user and for each work screen in the auxiliary information display area 6, will be described by reference to FIGS. 10 and 12. In this case, the user calls the designation screen by operating the keyboard and the function call button 4. FIG. 10 is a diagram illustrating an exemplary designation screen. The designation screen displays a preview 9, an auxiliary information menu 10, the user selection buttons 8, and the like. A preview display/touch area recognition unit 22 displays, as illustrated in FIG. 10, the preview 9 indicating contents (layout screen) displayed in carrying out work according to the work screen selected by a work screen selection button 2. The example of FIG. 10 is the preview 9 according to the machining work screen. An auxiliary information menu display/touch area recognition unit 23 displays, as illustrated in FIG. 10, the auxiliary information menu 10 listing auxiliary information that can be associated with the work screen. FIG. 10 is an example displaying a program, machining load, current position, machining time, and the like as associable auxiliary information.

On this designation screen, the operator first touches the appropriate user selection button 8 and identifies the user (operator) who is currently operating. This touch information of the user selection button 8 (identified user information) is input into the auxiliary information menu display/touch area recognition unit 23 and an auxiliary function button menu display/touch area recognition unit 24.

Next, the operator selects and designates the auxiliary information display area by touching any of the auxiliary information display areas A, B, and C in the preview 9. The preview display/touch area recognition unit 22 identifies the auxiliary information display areas A, B, and C touched by the operator, and makes the identified auxiliary information display area active. The auxiliary information display area made active is displayed in a form different from other auxiliary information display areas (for example, in a different color). Accordingly, the operator recognizes the auxiliary information display area currently active.

Then, the operator selects and designates the types of auxiliary information to be displayed in the auxiliary information display area currently active, by touching any of the auxiliary information displayed in the auxiliary information menu 10. The auxiliary information menu display/touch area recognition unit 23 identifies the auxiliary information touched by the operator. The auxiliary information menu display/touch area recognition unit 23 stores the identified auxiliary information in a selection designation storage unit corresponding to the identified operator, among a plurality of selection designation storage units 25, 26, and 27. At this time, the auxiliary information is stored while being associated with the work screen selected by the work screen selection button 2 and the auxiliary information display area identified by touching any of the auxiliary information display areas A, B, and C in the preview 9.

For example, in a case where the auxiliary information display area A is selected from the preview 9 and then "program" is selected from the auxiliary information menu 10 after a user X is selected by the user selection button 8 and a machining work screen (screen displaying the current position) is selected by the work screen selection button 2, the machining work screen (screen displaying the current position), the auxiliary information display area A, and the auxiliary information "program" are associated with each other and stored in a user X selection designation storage unit 25.

By the above operations, the display position and the type of the auxiliary information to be displayed are selected and designated for each user and for each work screen, and the display position and the type of the auxiliary information to be displayed for each work screen are stored in the user X selection designation storage unit 25, a user Y selection designation storage unit 26, or a user Z selection designation storage unit 27 according to the user selected and designated.

Next, a selection and designation method, with which three kinds of auxiliary function buttons are displayed for each user and for each work screen in the auxiliary function button display area 7, will be described by reference to FIGS. 11 and 12. The preview display/touch area recognition unit 22 displays, as illustrated in FIG. 11, the preview 9 for selecting the area displaying the auxiliary function buttons according to the work screen selected by the work screen selection button 2. FIG. 11 illustrates an example of the preview 9 on the machining work screen (displaying current position).

The auxiliary function button menu display/touch area recognition unit 24 displays, as illustrated in FIG. 11, an auxiliary function button menu 11 listing auxiliary functions that can be associated with the work screen. In FIG. 11, the auxiliary function button menu 11 displays, as auxiliary functions that can be associated with the basic work screen, a manual display function, a calculator function, a remotely connecting function with an external computer, a function of calculating cutting conditions, and the like.

On this designation screen, the operator first touches the appropriate user selection button 8 and identifies the user (operator) who is currently operating. This touch information of the user selection button 8 (identified user information) is input into the auxiliary information menu display/touch area recognition unit 23 and the auxiliary function button menu display/touch area recognition unit 24.

Next, the operator selects and designates the auxiliary function button display area by touching any of the buttons a, b, and c in the preview 9. The preview display/touch area recognition unit 22 identifies the auxiliary function button touched by the operator and makes the identified auxiliary function button active. The auxiliary function button made active is displayed in a form different from other auxiliary function buttons (for example, in a different color). Accordingly, the operator recognizes the auxiliary function button currently active.

Then, the operator selects and designates the type of the auxiliary function to be displayed on the auxiliary function button currently active, by touching any of the auxiliary functions displayed in the auxiliary function button menu 11. The auxiliary function button menu display/touch area recognition unit 24 identifies the auxiliary function touched by the operator. The auxiliary function button menu display/touch area recognition unit 24 stores the identified auxiliary function in the selection designation storage unit corresponding to the identified operator, among the plurality of selection designation storage units 25, 26, and 27. At this time, the auxiliary function is stored while being associated with the work screen selected by the work screen selection button 2 and the auxiliary function button display area identified by touching any of the auxiliary function buttons a, b, and c in the preview 9.

For example, in a case where the auxiliary function button b is selected from the preview 9 and then "manual" is selected from the auxiliary function button menu 11 after the user X is selected by the user selection button 8 and the machining work screen (screen displaying the current position) is selected by the work screen selection button 2, the machining work screen (screen displaying the current position), the auxiliary function button b, and the auxiliary function "manual" are associated with each other and stored in the user X selection designation storage unit 25.

That is, by the above operations, the display position and the type of the auxiliary function button to be displayed are selected and designated for each user and for each work screen, and the display position and the type of the auxiliary function button to be displayed for each work screen are stored in the user X selection designation storage unit 25, the user Y selection designation storage unit 26, or the user Z selection designation storage unit 27 according to the user selected and designated.

A method for selecting and designating the auxiliary information and the auxiliary function button to be displayed for each user and for each work screen; specifically, the procedure and the storing form using the touch panel, have been described above by reference to FIGS. 10 to 12. However, it should be noted that the present invention is not limited to this specific method.

Next, a method will be described by reference to FIGS. 13 and 14, where the auxiliary information selected and designated for each user and for each work screen is displayed in the auxiliary information display area 6, and similarly the auxiliary function button selected and designated for each user is displayed in the auxiliary function button display area 7.

A basic work screen display unit 21 displays, as illustrated in FIG. 14, the basic work screen 5 in the display area according to the work screen selected by the work screen selection button 2. This example is an example of a screen displaying a machining program in operation among the machining work screens. At the same time, an auxiliary information display unit 28 recognizes the type and the display position of the auxiliary information, associated with the basic work screen selected by the work screen selection button 2, and stored in the selection designation storage units 25, 26, and 27 corresponding to the type of user selected by the user selection button 8, and, as illustrated in FIG. 14, displays the auxiliary information of a type recognized in the recognized position. Similarly, an auxiliary function button display unit 29 recognizes the type and the display position of the auxiliary function, associated with the basic work screen selected by the work screen selection button 2, and stored in the selection designation storage units 25, 26, and 27 corresponding to the type of user selected by the user selection button 8, and, as illustrated in FIG. 14, displays the auxiliary function button of a type recognized in the recognized position.

Finally, the operation of the auxiliary function button will be described by reference to FIGS. 13 and 15. An auxiliary function button touch area recognition unit 30 recognizes the auxiliary function to be executed based on the information on a touch area sent from the touch panel screen 1 and the information on the position and type of the auxiliary function button currently displayed, sent from the auxiliary function button display unit 29, and notifies an auxiliary function execution unit 31. The auxiliary function execution unit 31 executes auxiliary functions and displays necessary screens on the touch panel screen 1. FIG. 15 is a diagram illustrating a manual reference function 12 displayed on the touch panel screen 1 by pressing down the auxiliary function button "manual."

Any of the configurations described above is only an example. Other configurations may be changed so long as one or more pieces of the auxiliary information and/or auxiliary function buttons are displayed at the same time as the basic work screen, and the displayed auxiliary information and/or auxiliary function buttons can be freely set by the user. For example, in the present embodiment, both of the auxiliary information and the auxiliary function buttons are displayed, but it may be the case that only one of them is displayed. In addition, the numbers of auxiliary information and auxiliary function buttons to be displayed are not particularly limited so long as they are one or more. In the present embodiment, the auxiliary information and the auxiliary function buttons to be displayed can be set not only for each basic work screen but also for each user, but it may be the case that they are not set for each user. Furthermore, in the present embodiment, the display screen is a touch panel screen having a touch detection function, but a simple display screen without the touch detection function may be used. In that case, it is only necessary that the auxiliary function button and the user selection button 8 be selected through input devices such as a mouse and a keyboard.

In any case, with the technique of the present embodiment, in addition to the basic work screen where information required for work using a machine tool is displayed and buttons calling necessary functions are disposed, information to be displayed supplementarily and buttons calling functions to be used supplementarily in executing the work can be disposed freely.

As a result, even when creating a program during machining, an operation of switching into a machining work screen will be eliminated by disposing and displaying information for confirming the machining status as auxiliary information in the remaining areas of the screen display area, in addition to the program creating screen that is one of the basic work screens.

Similarly, in confirming the machining status during machining, an operation of switching machining work screens will be eliminated by disposing and displaying the information to be confirmed additionally as auxiliary information in the remaining areas of the screen display area, in addition to the machining work screen that is one of the basic work screens. Similarly, negative effects will be eliminated, such as looking for a button calling the function to be used due to the increased functions and switching work screens in order to use the button, by displaying, in the remaining areas of the screen display area, the buttons calling functions to be used additionally, in addition to the buttons calling the functions disposed on each basic work screen.

Similarly, the buttons calling the functions to be used can be disposed freely. Therefore, given that machine tools are used for long periods of 10, 15, and 20 years, new functions that have been developed in order to increase the productivity of the machine tools along with technical advancement in computer software can be added and used on the work screens of old machines. Furthermore, the information to be displayed supplementarily and buttons calling functions to be used supplementarily in executing work can be freely disposed for each operator; that is, depending on the work procedure and proficiency of each operator. Thus, work efficiency will be increased.

What is claimed is:

1. A numerical control system for a machine tool, comprising:
- a display screen;
- a storage unit;
- a user interface; and
- a processor,
- wherein the processor is configured to, in response to a first user input from the user interface selecting a work process, control the display screen to simultaneously display:
  - a basic work screen associated with the selected work process; and
  - auxiliary content associated with the basic work screen;
- wherein the processor is further configured to, in response to a second user input from the user interface to call a designation screen, control the display screen to display a menu displaying candidate auxiliary content that can be associated with the basic work screen;
- wherein the processor is further configured to, in response to a third user input from the user interface selecting auxiliary content from the candidate auxiliary content, store in the storage unit an association between the basic work screen and the selected auxiliary content;
- wherein the auxiliary content is one or more pieces of auxiliary information or one or more virtual buttons that, when activated, actuate one or more auxiliary functions;
- wherein the basic work screen is prepared for each of a plurality of work processes which use machine tools, and the plurality of work processes include at least one of a machining work, a program creation work, and a tool preparation work;
- wherein the first user input, the second user input, and the third user input are user inputs that are different from each other, and
- wherein plural user selection buttons respectively associated with distinctive plural users are simultaneously displayed on the user interface to select the distinctive plural users.

2. The numerical control system for a machine tool according to claim 1,
- wherein a correspondence relationship between a plurality of basic work screens and the one or more pieces of auxiliary information or one or more auxiliary functions is set and stored for each of two or more users, and
- the processor displays, one or more pieces of auxiliary information or one or more virtual buttons, both of which are associated with a user who performs operation.

3. The numerical control system for a machine tool according to claim 1, wherein the display screen is a touch panel screen.

4. The numerical control system for a machine tool according to claim 1, wherein the designation screen is a screen simultaneously displaying a preview screen indicating a screen layout and a menu screen listing two or more pieces of auxiliary information or two or more virtual buttons, both of which are selectable.

* * * * *